March 4, 1947.    H. S. REMMER    2,416,954
STUD WELDING GUN
Filed Feb. 26, 1945

INVENTOR
HERBERT S. REMMER
BY
Charles S. Evans
his ATTORNEY

Patented Mar. 4, 1947

2,416,954

UNITED STATES PATENT OFFICE 2,416,954

STUD WELDING GUN

Herbert S. Remmer, Oakland, Calif., assignor to Ted Nelson, San Leandro, Calif.

Application February 26, 1945, Serial No. 579,707

6 Claims. (Cl. 219—4)

The invention relates to the art of arc welding studs; and one of the objects of the invention is to provide improved means for holding a ferrule around the site of the weld. Another object is the provision of improved means for supporting the welding gun while the weld is being made.

My invention possesses other objects and features of value, some of which with the foregoing will be set forth in the following description of the invention. It is to be understood that I do not limit myself to the showing made by the said description and the drawings as I may adopt variant forms of the invention within the scope of the appended claims.

Figure 1:
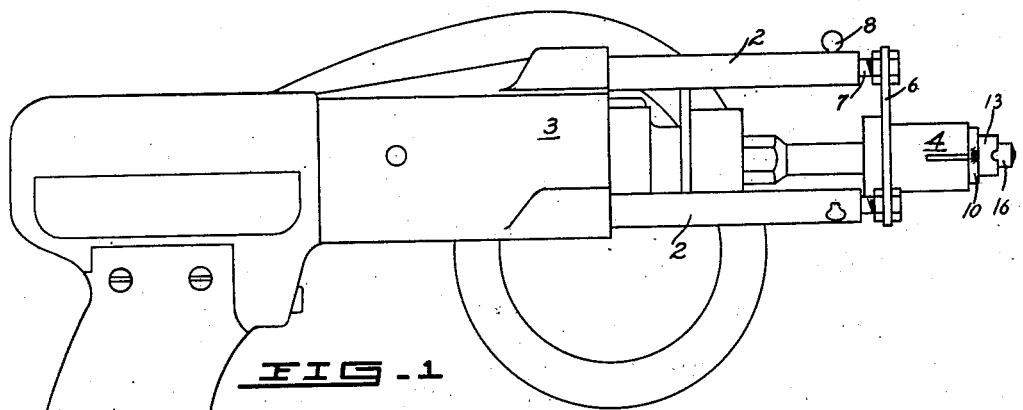
Figure 2:
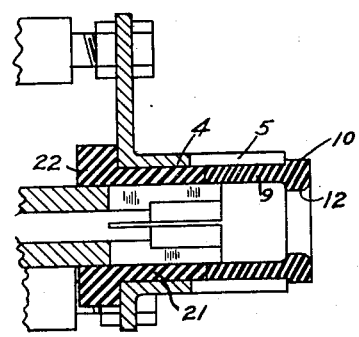
Figure 3:
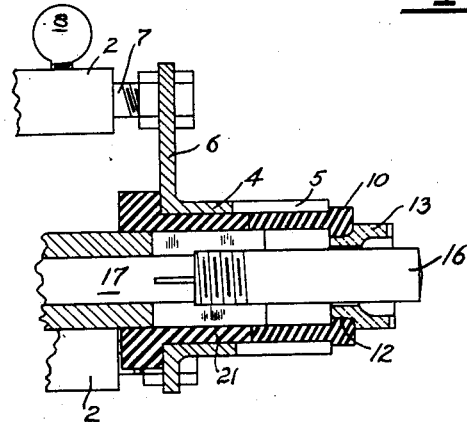
Figure 4:
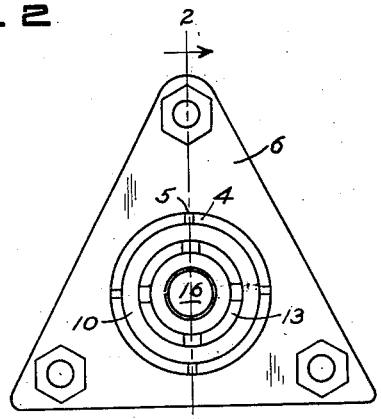

Referring to the drawings: Figure 1 is a side elevation on a reduced scale of a stud welding gun embodying my invention. Figure 2 is a vertical sectional view of the right end of the gun, showing the chuck assembly. The scale is substantially full size, and the plane of section is indicated by the line 2—2 in Figure 4. Figure 3 is a view similar to Figure 2, but showing a stud and ferrule held in their respective chucks. Figure 4 is an end elevation of the chuck assembly only.

When studs are arc welded to a supporting structure such as a plate, it has been customary to hold the stud in the chuck of a welding gun, adjusting the legs of the gun so that the stud projects a small amount beyond the plane of the leg ends. The stud can then be centered on the exact spot where it is to be welded, and when the gun is pressed to seat the legs, the stud and chuck are pushed back against the resistance of a spring which insures that the stud shall maintain a good electrical contact with the plate.

When the trigger switch of the gun is pressed to close the welding circuit through the stud, it is lifted from the plate to draw an arc and after a timed interval during which the stud and adjacent area of the plate reach a welding temperature, the circuit is broken, and the stud is thrust against the plate, the metal coalescing to form the weld. It is of very great advantage for a number of reasons to surround the welding end of the stud at the moment of welding with a refractory sleeve or ferrule. The ferrule, surrounding the weld site, confines and shields the arc, prevents spatter, and may be made to act, in part at least, as a mold. It has been the practice to hold the ferrule about the stud in the end of a coil spring surrounding the stud and adjustable on the stud chuck as is shown in the patent to Nelson No. 2,355,099, dated August 8, 1944.

In general this represents a big advance over previously used methods and means, but different studs require different springs, which requires the operator to have a variety of springs available and to change the spring if the stud length is changed. The same is true of a change in the diameter of the stud. Altogether, the spring means for holding the ferrule has been something of a nuisance, and the need for a new holding means for the ferrule has long been apparent.

I have met this problem by adjustably mounting on the body of the gun, a ferrule chuck which surrounds the stud; and holds the ferrule close to the stud end. When the stud is positioned on the site of the weld and the gun pressed firmly ahead to seat the ferrule, the gun is literally supported directly on the ferrule chuck and ferrule as a single leg. So supported it is found to have no material tendency to wobble or skid off the mark.

While the wide 3-leg support obviously resulted in practically perfect perpendicularity of the stud when welding to a flat plate; and the chuck-ferrule support of the present invention lacks the breadth of base which three legs give, it is found nevertheless that only a moderate degree of deftness is required to seat the narrower ferrule evenly. This is quickly acquired so that the studs are welded within the small limits of permissible error as easily as before, but with very material advantages in speed; and much greater maneuverability on all curved or irregular surfaces or in close quarters.

I have shown my invention incorporated into a stud welding gun of the sort shown and described in the copending application of Ted Nelson, Serial No. 528,196, filed March 27, 1944, now Patent No. 2,413,189, dated December 24, 1946. Slidably mounted for adjustment on the legs 2, extending forwardly from the main body of the gun is the ferrule chuck assembly; comprising the cylindrical sleeve or chuck 4 the free end of which is split by the slots 5. The sleeve has the flange 6 to which are secured legs 7 telescoped in the tubular legs 2, and held in adjusted position by means of thumb screws 8 in the walls of the tubular legs. This mounting of the sleeve 4 permits it and the parts carried by it, to be adjustably fixed at varying distances from the body of the gun; and the assembly in effect comprises a single adjustable leg for the support of the gun during the welding cycle.

Seated in the resilient end of the chuck 4 is a dielectric fiber bushing or collet 9, having a knurled external flange 10, which seats against the rim of the chuck, and so fixes the axial position of the bushing in the chuck. The collet is also provided with an inwardly extending flange 12 at its outer end; and this flange and the edge of the bushing are shaped and sized to receive and hold a ferrule 13. Since ferrules may vary in size, the radial width of the flange 12 also varies in different collets, although the outside diameter remains the same for all collets. The operator therefore carries a collet for each size of ferrule; and it is only a moment's work to withdraw a collet and push in another.

From an inspection of Figure 3, it will be observed that when a stud 16 is held in the stud chuck 17, the sleeve or ferrule chuck 4, surrounds the end of the stud chuck and part of the stud, leaving the end of the latter extending about ⅜" beyond the ferrule held in the ferrule chuck. This permits the operator a clear view of the stud end, so that it is readily placed on the mark indicating the location of the stud. Pressing the gun forward then seats the ferrule, the stud and its chuck being pressed back against the resistance of a spring forming part of the gun mechanism. If the ferrule is evenly seated, the stud will be perpendicular to the flat surface to which it is welded; and handling the gun to evenly seat the ferrule is quickly learned.

While I have explained a ferrule chuck in which different collets are used for ferrules of different diameters, it is to be understood that where ferrules of the same outside diameter are the only ones to be used, the collet may be omitted, and the rim of the ferrule chuck sleeve 4 conditioned to receive and resiliently retain the ferrule in substantially the same way as the stud chuck receives and holds the stud.

Since my invention is intended for use in a welding gun in which the welding current passes through the stud chuck to the stud, it is quite important to thoroughly insulate the ferrule chuck assembly from the stud chuck and stud. This is part of the function of the bushing 10, and why it is made of a dielectric fiber. Of course the ferrule which is usually of porcelain or similar material provides good insulation in itself but where the collet is used, the protection against a short circuit at this point is doubly sure.

For a similar reason it is preferred to interpose a dielectric fiber bushing 21, having the flanged head 22 between the ferrule chuck and the stud chuck. This bushing, tight in the sleeve of the ferrule chuck permits free movement of the stud chuck, and each is thus braced and supported by the other against lateral displacement.

I claim:

1. In a gun for welding a stud within an enclosing ferrule, a chuck for carrying the stud, a sleeve surrounding the stud chuck, means for adjusting the sleeve axially relative to the stud chuck, a dielectric bushing between the sleeve and stud chuck, and a collet on the sleeve for carrying the ferrule.

2. In a gun for welding a stud within an enclosing ferrule, a chuck for carrying the stud, a chuck for carrying the ferrule, means spacing said ferrule chuck from the body of the gun, and means for adjusting the ferrule chuck axially relative to the stud chuck.

3. In a gun for welding a stud within an enclosing ferrule, a chuck for carrying the stud, a chuck for carrying the ferrule, and means comprising a plurality of telescoping legs connecting the ferrule chuck to the gun for supporting the gun on the ferrule.

4. In a gun for welding a stud within an enclosing ferrule, a chuck for carrying the stud, a chuck for carrying the ferrule, means connecting the ferrule chuck and the gun in spaced relation for supporting the gun on the ferrule, and means for adjusting the length of said connecting means.

5. The combination with a stud gun having a chuck for frictionally retaining a stud to be arc welded to a metal surface; of a ferrule holder comprising a rod-like member adjustably secured to the gun and radially displaced from the chuck, and an eye member carried by the rod and angularly disposed with reference thereto, and so located as to center over the chuck and stud, and an insulating ferrule releasably carried by said eye member, and serving as a foot for the gun, and as a collar or sleeve for the stud during the arc welding operation.

6. The combination as set forth in the preceding claim, wherein an elongated insulating sleeve is carried by said eye member, and the ferrule is supported at the end of the sleeve.

HERBERT S. REMMER.

REFERENCES CITED

The following references are of record in the file of this patent:

UNITED STATES PATENTS

| Number | Name | Date |
| --- | --- | --- |
| 2,110,832 | Hogg et al. | Mar. 8, 1938 |
| 2,315,502 | Crecca et al. | Apr. 6, 1943 |